Patented Aug. 22, 1933

1,923,239

UNITED STATES PATENT OFFICE 1,923,239

BARBITURIC ACID DERIVATIVE

Ludwig Taub and Walter Kropp, Elberfeld, Germany, assignors to Winthrop Chemical Company, Inc., New York, N. Y., a Corporation of New York No Drawing. Application June 19, 1930, Serial No. 462,413, and in Germany July 8, 1929

5 Claims. (Cl. 260—33)

The present invention relates to new pharmaceutically valuable barbituric acid derivatives of the probably general formula

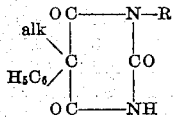

wherein "alk" means an alkyl radicle which preferably contains from 1 to 3 carbon atoms and "R" means methyl or ethyl.

It is known that N-methyl diethyl barbituric acid exerts a considerably more toxic action than diethyl barbituric acid. The object of the present invention is to prepare the mono-substituted N-methyl- or N-ethyl-derivatives of phenyl alkyl barbituric acids and salts thereof. The said derivatives are distinguished from the parent substances, which are not substituted at the nitrogen atom, by a reduced toxicity and moreover by a prolonged effect. Since, in addition, the new barbituric acids are tasteless, or nearly tasteless, they are taken willingly even by sensitive patients, and, therefore, they constitute a valuable enrichment of our medical resources.

The new barbituric acid derivatives of the above probable formula can be produced according to methods which are known for the synthesis of barbituric acids and derivatives thereof. Thus, for example, N-methyl-C-C-phenyl-ethyl barbituric acid can be obtained by reacting upon phenyl-ethyl-malonic acid ester with N-methylurea in the customary manner according to the following equation

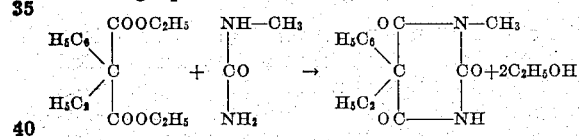

In a similar manner for example N-methyl-C-C-phenyl-methyl barbituric acid can be produced by reacting upon phenyl-methyl-malonic acid ester with N-methyl-guanidine and saponifying the intermediate product according to the following schematic equation

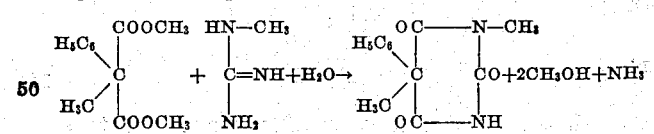

Instead of starting with phenyl-alkyl-malonic acid esters it is possible to employ as starting materials the phenyl-alkyl-malonic acids themselves or other derivatives thereof such as amides, amide-acid esters, chlorides and nitriles, likewise phenyl alkyl cyanacetic acids and their derivatives and to convert them into N-methyl or N-ethyl-C-C-phenyl-alkyl barbituric acids by reacting upon N-methylated or N-ethylated ureas, guanidines, thioureas, ethers of isourea according to methods known per se. Alternatively the C-phenyl barbituric acids or the C-C-phenyl-alkyl barbituric acids can be methylated or ethylated or the N-methyl- or N-ethyl-C-phenyl barbituric acids can be alkylated according to the customary processes. Thus, for example, N-methyl-C-C-phenyl-allyl barbituric acid can be produced by a reaction proceeding according to the following equation

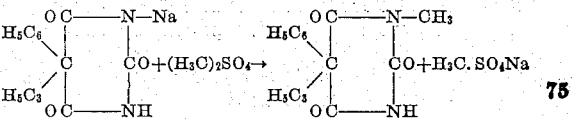

Instead of dialkylsulfates also alkylhalides or toluolsulfonic acid alkyl esters may be employed for the alkylating process.

The new products thus obtainable are colorless, tasteless or nearly tasteless crystals, sparingly soluble in cold water, more soluble in alcohols. They exhibit an acid character and dissolve in alkalies. They can be used medicinally in substance as well as in form of their salts with inorganic or organic bases.

Such saltforming inorganic bases are preferably alkali- and alkaline earth-metal hydroxides and ammonia, as organic bases may be mentioned by way of example diethylamine, ethylene diamine, piperazine, diethylamino-ethanol, papaverine, quinine, dimethylamino-phenyl-dimethyl-pyrazolone and the like. Also these salt-like compounds of the N-methyl- or N-ethyl-C-C-phenyl-alkyl barbituric acids are intended to be included in our invention.

The invention is illustrated by the following examples, without being limited thereto; the parts being by weight:—

Example 1.—*N-methyl-C-C-phenyl-ethyl-barbituric acid*

46 parts of sodium metal are dissolved in 1000 parts of absolute alcohol, 264 parts of the diethyl ester of phenyl-ethyl-malonic acid and 80 parts of mono-methyl urea are added to this solution and the mixture heated for 8 hours under reflux. The alcohol is then distilled off, the residue, when cold, is dissolved in water, and the solution is neutralized by means of dilute sulfuric acid. The finely powdered N-methyl-C-C-phenyl-ethyl barbituric acid, which separates, is filtered by suction, washed till neutral and redissolved by means of about 50 parts of boiling alcohol. The resulting substance forms coarse, colorless prisms, which melt at 176.5° C. and are tasteless. The new product dissolves in alkalies and can be re-precipitated unchanged by acids.

*Example 2.—N-methyl-C-C-phenyl-ethyl barbituric acid*

218 parts of N-methyl-C-phenyl barbituric acid, obtainable by the condensation of molecular quantities of phenyl malonic ester and mono-methyl urea in sodium ethylate solution in the form of micro crystalline needles of the melting point 245° C., according to the directions of the process described in Example 1, are pasted with 3000 parts of water to a thin, milk-like consistency and neutralized accurately with the calculated quantity of ammonia. The ammonium salt of the N-methyl-C-phenyl barbituric acid, which separates, is filtered by suction, dried and finely powdered; it is then mixed with 110 parts of ethyl bromide and 250 parts of xylene and heated for 12 hours at 190° C. in a stirring autoclave. After cooling the reaction mixture is filtered by suction, washed with xylene and the N-methyl-C-C-phenyl-ethyl barbituric acid is extracted from the residue by means of hot alcohol. After recrystallizing from hot water the product shows the melting point of 176.5° C.

*Example 3.—N-ethyl-C-C-phenyl-ethyl barbituric acid*

95 parts of mono-ethyl urea and 264 parts of the diethyl ester of phenyl-ethyl-malonic acid are added to a solution of 46 parts of sodium in 1000 parts of alcohol and the mixture boiled for about 10 hours under reflux. The alcohol is then distilled off, the residue taken up with water after cooling and the aqueous solution acidified with dilute hydrochloric acid. The first oily N-ethyl-C-C-phenyl-ethyl barbituric acid which separates, solidifies on rubbing to a crystalline magma, from which colorless needles of the melting point 102° C. are obtained after recrystallizing from alcohol.

*Example 4.—N-methyl-C-C-phenyl-methyl barbituric acid*

150 parts of mono-methyl urea and 250 parts of the diethyl ester of phenyl-methyl-malonic acid are added to a solution of 46 parts of sodium in 1000 parts of ethyl alcohol. The mixture is heated at the boiling point for about 10 hours. After cooling, neutralization is effected by means of dilute acetic acid, the alcohol is distilled off and the solid residue is redissolved in boiling water. The new acid takes the form of colorless needles, which melt at 154° C.

*Example 5.—N-methyl-C-C-phenyl-methyl barbituric acid*

208 parts of the dimethyl ester of phenyl-methyl-malonic acid and 115 parts of mono-methyl guanidine sulfate are added to a solution of 69 parts of sodium in 1000 parts of methyl alcohol and the mixture is heated under reflux for 10 hours. After cooling the reaction product is poured into water and neutralized with dilute acetic acid. The imino barbituric acid, which separates in powder form and which is very difficultly soluble in water, is filtered by suction, stirred with 1000 parts of 40% sulfuric acid and boiled for 6 hours. On cooling the N-methyl-C-C-phenyl-methyl barbituric acid separates in crystalline form and after recrystallizing from methyl alcohol is obtained in the form of colorless prisms, which melt at 154° C.

*Example 6.—N-methyl-C-C-phenyl-ethyl barbituric acid*

232 parts of C-C-phenyl-ethyl barbituric acid are dissolved in 4000 parts of cold normal caustic soda lye, 126 parts of dimethyl sulfate are gradually added to this solution with strongly stirring. When the solution has become clear, the reaction has been finished. Then the solution is acidified with dilute sulfuric acid and is stirred, until the precipitate, being at first oily-resinous, has become a crystalline powder. The precipitate is strongly sucked off, washed to neutral reaction and recrystallized from alcohol. The substance obtained displays the same properties as the product described in Example 1.

In an analogous manner the N-methyl-C-C-phenyl-propyl barbituric acid can be prepared. It forms colorless, tasteless needles of melting point 109° C.

We claim:—

1. The barbituric acid derivatives of the probable general formula

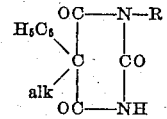

wherein "alk" means an alkyl group, "R" means a saturated alkyl group of 1 to 2 carbon atoms, said products being colorless, practically tasteless substances, soluble in aqueous alkalies, forming salts with inorganic and organic bases, being pharmaceutically valuable products.

2. The barbituric acid derivatives of the probable general formula

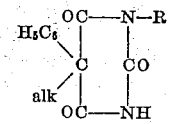

wherein "alk" means an alkyl group of 1 to 3 carbon atoms and "R" means a saturated alkyl group of 1 to 2 carbon atoms, said products being colorless, practically tasteless substances, soluble in aqueous alkalies, forming salts with inorganic and organic bases, being pharmaceutically valuable products.

3. The barbituric acid derivatives of the probable general formula

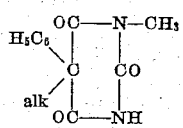

wherein "alk" means an alkyl group of 1 to 3 carbon atoms, said products being colorless, practically tasteless substances, soluble in aqueous alkalies, forming salts with inorganic and organic bases, being pharmaceutically valuable products.

4. The product of the probable formula

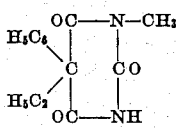

said product forming colorless, tasteless crystals of melting point 176.5° C., soluble in alkalies, forming salts with inorganic and organic bases, being a pharmaceutically valuable substance.

5. The product of the probable formula:

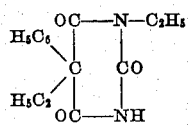

said product forming colorless needles of the melting point 102° C. soluble in aqueous alkalies, and forming salts with inorganic and organic bases.

LUDWIG TAUB.
WALTER KROPP.